P. N. MOORE.
ROLLER SIDE BEARING.
APPLICATION FILED FEB. 23, 1910.
963,460.
Patented July 5, 1910.
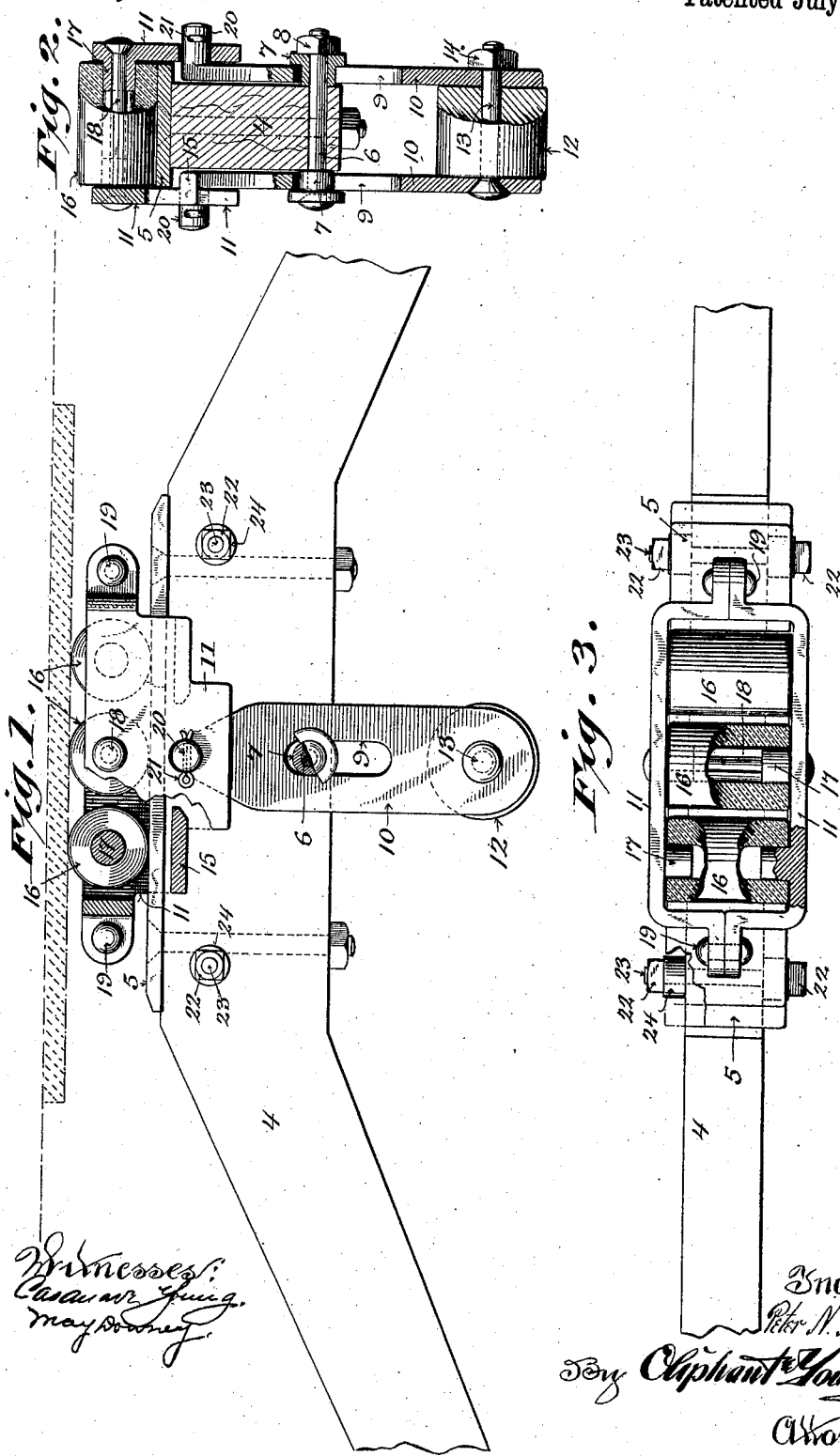

UNITED STATES PATENT OFFICE.

PETER N. MOORE, OF MILWAUKEE, WISCONSIN.

ROLLER SIDE BEARING.

963,460.

Specification of Letters Patent. Patented July 5, 1910.

Application filed February 23, 1910. Serial No. 545,464.

*To all whom it may concern:*

Be it known that I, PETER N. MOORE, a citizen of the United States, and resident of Milwaukee, in the county of Milwaukee and State of Wisconsin, have invented certain new and useful Improvements in Roller Side Bearings; and I do hereby declare that the following is a full, clear, and exact description thereof.

My invention consists in what is herein particularly set forth with reference to the accompanying drawings and pointed out in claims of this specification, its object being to provide simple, economical and efficient roller side bearings applicable to railway-car trucks in opposition to car-bodies thereon, provision being had for travel of the rollers, under pressure, on a supporting surface in either of two directions from their normal position to which they have automatic return when the pressure is removed; said roller side bearings being especially designed for use in connection with side-bearing bridges of railway passenger-car trucks to which they may be readily applied at small expense.

Figure 1 of the drawings represents a side elevation of a roller side bearing in accordance with my invention partly broken away and applied in connection with a side bearing bridge of a passenger-car truck; Fig. 2, a partly transverse central section view of the parts shown in Fig. 1, and Fig. 3, a plan view, partly in horizontal section, of the roller side bearing and truck bridge.

Referring by numerals to the drawings, 4 indicates a side bearing bridge of a railway passenger-car truck, and 5 the wear-plate with which the bridge is ordinarily provided, this plate being extended beyond the sides of the bridge. Supported in connection with the bridge is a bolt 6 that extends through a pair of flanged pivot-sleeves 7, and a nut 8 is run on the bolt to oppose one of the sleeves, the other sleeve being opposed by the head of the bolt. The bolt is herein shown as extending through the bridge, but it may be otherwise supported in connection with the same or instead of said bolt and sleeves thereon other provision may be had for pivots laterally of said bridge.

Each of the pivot-sleeves herein shown extends through a vertical slot 9 in a hanger 10 having pivotal suspension with an angular plate 11 of a preferably separable carriage-frame, and a preferably cylindrical weight 12 is horizontally suspended on a bolt 13 engaging the lower ends of the hangers and having a nut 14 run thereon.

Each plate of the carriage-frame is provided with lower inwardly extending end flanges 15 longitudinally thereof, and these flanges project under the plate 5 to limit upward play of said frame. Mounted in the frame to run on the plate 5 or other opposing surface are bearing-rollers 16 that oppose a car-body or a wear-plate attached thereto, such a body and plate being indicated by dotted lines in Fig. 1. The plates 11 of the carriage-frame are preferably provided with inner studs 17 that engage the rollers 16, the center studs being bored for the passage of a bolt or rivet 18 that also engages said plates. Other bolts or rivets 19 are employed to fasten the ends of the plates of the carriage-frame together.

Each of the hangers 10 is preferably provided with a pivot-stud 20 that extends through an eye provided for same in a side plate 11 of the carriage, and a split-key 21 is shown extending through the end of each stud beyond the adjacent plate. The upper end of each hanger is preferably tapered and the inner ends of the plate flanges 15 are beveled to match the taper of the opposing hangers.

To limit travel of the carriage in either direction from normal position, the bridge 4 is provided with stops, and to afford a sufficiency of such travel, the lower corners of the plates 11 of said carriage are angularly notched opposite said stops. The stops herein shown are nuts 22 on bolts 23 extending through the bridge 4, spacing-washers 24 being employed on the bolts between the said bridge and nuts.

When the carriage has travel, in either direction from normal position, under pressure upon the bearing-rollers 16, the hangers 10 with the weight 12 have sway in the opposite direction and a lift in proportion to the sway, the combined movement being a result of the slot engagement of each hanger with a stationary pivot. When the pressure is removed, the weight 12 operates by gravity to automatically restore the carriage and parts therewith to normal position.

The construction and arrangement of parts herein shown and described constitute a practical form of my invention but in matters of detail my improved side roller bearing is susceptible of indefinite variation without departure from the scope of the claims herewith.

I claim:

1. A roller side bearing comprising a carriage-frame and rollers therein, longitudinally slotted hangers in pivotal suspension from the carriage-frame, a weight in connection with the hangers, and pivots that engage the slots of said hangers, these pivots being for connection with a support for the bearing.

2. A roller side bearing comprising a carriage-frame having side bars thereof provided with inner studs, rollers engaged by the studs, longitudinally slotted hangers in pivotal suspension from the carriage-frame, a weight in connection with the hangers, and pivots that engage the slots of said hangers, these pivots being for connection with a support for the bearing.

3. A roller side bearing comprising a carriage-frame and rollers therein, longitudinally slotted hangers provided with pivot-studs engaging eyes in sides of the carriage-frame, a weight in connection with the hangers, and pivots that engage the slots of said hangers, these pivots being for connection with a support for the bearing.

4. A roller side bearing comprising a carriage-frame and rollers therein, inner flanges on the sides of the carriage-frame arranged to underlie the roller-track, longitudinally slotted hangers in pivotal suspension from said carriage-frame, a weight in connection with the hangers, and pivots that engage the slots of said hangers, these pivots being for connection with a support for said track.

5. A roller side bearing comprising a carriage-frame and rollers therein, longitudinally slotted hangers in pivotal-suspension from the carriage-frame, pivot-sleeves having fixed support in connection with a support for the bearing and engaging the slots of the hangers, and a weight in connection with said hangers.

6. A support, a roller side bearing thereon comprising a carriage-frame and rollers therein, longitudinally slotted hangers in pivotal suspension from the carriage-frame, pivots arranged in connection with the support to engage the slots in the hangers, a weight in connection with said hangers, and stops arranged in connection with said support to limit travel of said frame and rollers in either direction from normal position.

7. A railway-car truck-bridge, a roller side bearing thereon comprising a carriage-frame and rollers therein, longitudinally slotted hangers in pivotal suspension from the carriage-frame, pivots arranged in connection with the bridge to engage the slots of the hangers, and a weight in connection with said hangers.

8. A railway-car truck-bridge, a roller side bearing thereon comprising a carriage-frame and rollers therein, longitudinally slotted hangers in pivotal suspension from the carriage-frame, pivots arranged in connection with the bridge to engage the slots of the hangers, a weight in connection with the hangers, and stops arranged in connection with said bridge to limit travel of said carriage-frame and rollers in either direction from normal position.

9. A railway-car truck-bridge and a laterally projecting wear-plate thereon, a roller side bearing comprising a carriage-frame and rollers therein on the wear-plate, inner side flanges of the carriage-frame underlying the projections of said wear-plate, longitudinally slotted hangers in pivotal suspension from said carriage-frame, pivots arranged in connection with the bridge to engage the slots of the hangers, and a weight in connection with said hangers.

10. A railway-car truck-bridge and a laterally projecting wear-plate thereon, a roller side bearing comprising a carriage-frame and rollers therein on the wear-plate, inner side flanges of the carriage-frame underlying the projections of said wear-plate, longitudinally slotted hangers in pivotal suspension from said carriage-frame, pivots arranged in connection with the bridge to engage the slots of the hangers, a weight in connection with said hangers, and stops arranged in connection with said bridge to limit travel of said carriage-frame in either direction from normal position.

In testimony that I claim the foregoing I have hereunto set my hand at Milwaukee in the county of Milwaukee and State of Wisconsin in the presence of two witnesses.

PETER N. MOORE.

Witnesses:
 GEORGE T. MOORE,
 V. W. SEELY.